A. A. PAGE.
LOCK.
APPLICATION FILED APR. 10, 1911.

1,137,785.

Patented May 4, 1915.
3 SHEETS—SHEET 1.

WITNESSES:
F. A. Carlson
M. O. Williams

INVENTOR.
Albert A. Page
BY Beach & Fisher
ATTORNEYS

THE NORRIS PETERS CO., PHOTO-LITHO., WASHINGTON, D. C.

A. A. PAGE.
LOCK.
APPLICATION FILED APR. 10, 1911.

1,137,785.

Patented May 4, 1915.
3 SHEETS—SHEET 2.

WITNESSES:
F. A. Carlson
M. O. Williams

INVENTOR.
Albert A. Page
BY Beach & Fisher
ATTORNEYS

A. A. PAGE.
LOCK.
APPLICATION FILED APR. 10, 1911

1,137,785.

Patented May 4, 1915.
3 SHEETS—SHEET 3.

WITNESSES:
F. A. Carlson
M. O. Williams

INVENTOR.
Albert A. Page
BY
Beach & Fisher
ATTORNEYS

UNITED STATES PATENT OFFICE.

ALBERT A. PAGE, OF EAST HAVEN, CONNECTICUT, ASSIGNOR TO SARGENT & COMPANY, OF NEW HAVEN, CONNECTICUT, A CORPORATION OF CONNECTICUT.

LOCK.

1,137,785.  Specification of Letters Patent.  Patented May 4, 1915.

Application filed April 10, 1911. Serial No. 620,149.

*To all whom it may concern:*

Be it known that I, ALBERT A. PAGE, a citizen of the United States, residing in the town of East Haven, county of New Haven, and State of Connecticut, have invented certain new and useful Improvements in Locks, of which the following is a full, clear, and exact description when taken in connection with the accompanying drawings, which form a part thereof, and in which drawings—

Figure 1:
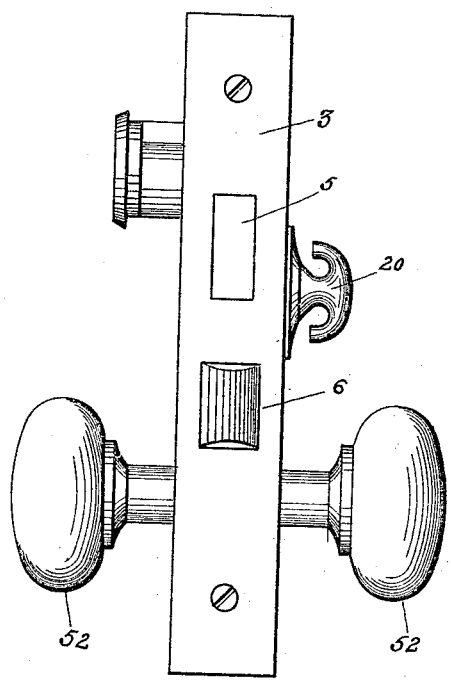
Figure 2:
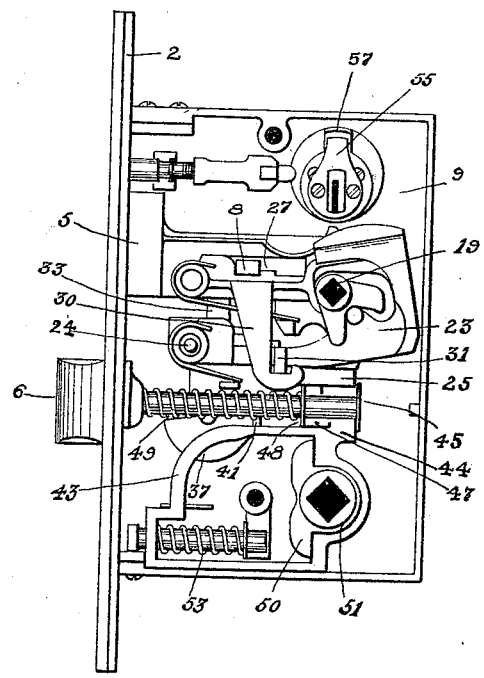
Figure 5:
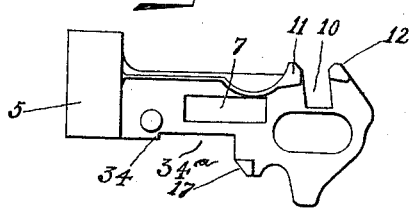
Figure 6:
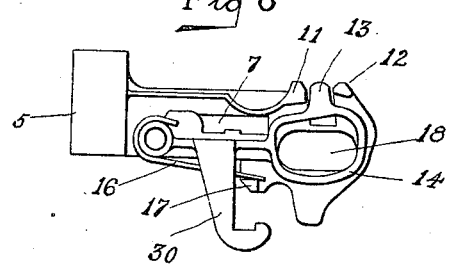
Figure 3:
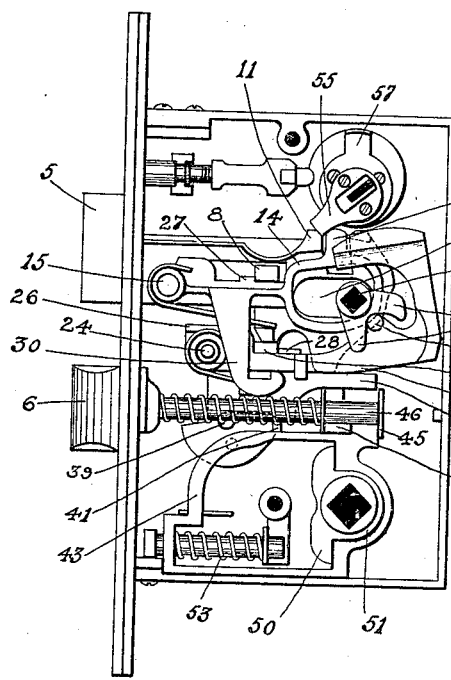
Figure 4:
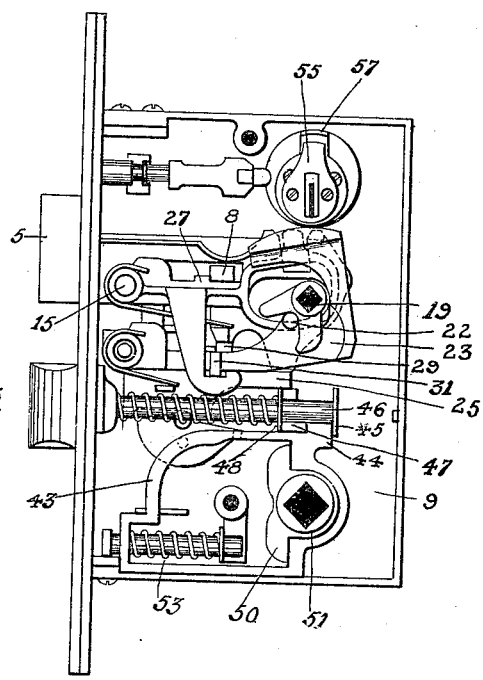
Figure 7:
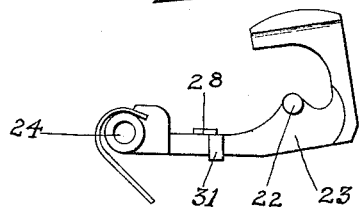
Figure 8:
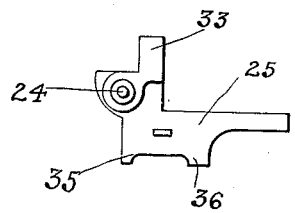
Figure 10:
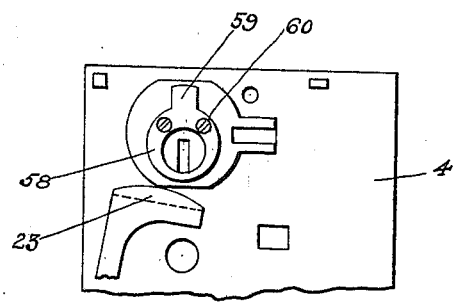
Figure 11:
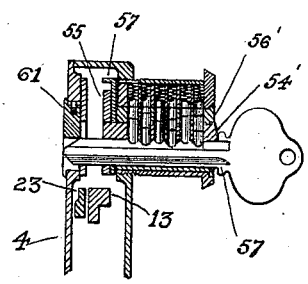
Figure 9:
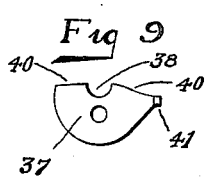
Figure 12:
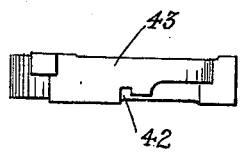
Figure 13:
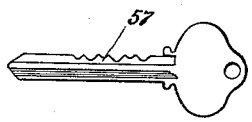
Figure 14:
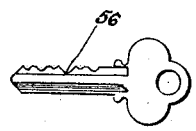
Figure 15:
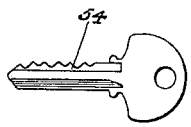

Figure 1 is a front view of the lock casing, looking toward the face plate; Fig. 2, a side view in elevation from the inside of the casing with the cap plate removed, and showing the dead bolt in retracted position; Fig. 3, a view similar to Fig. 2, but with the dead bolt protracted and the other parts in such relative position as results from such protraction by one of the keys operating on the outside of the casing; Fig. 4, a view similar to Fig. 2, showing the bolt protracted and the latch-bolt and knob deadlocked when so operated by the action of the inside operating means; Fig. 5, a detail plan view of the dead-bolt alone; Fig. 6, a similar view of the dead-bolt and the tumbler having independent control of the dead-bolt; Fig. 7, a similar view of the common coupling tumbler controlling the joint operation of the dead-bolt and the dead-locking device for the latch-bolt and its knob; Fig. 8, a similar view of the slide bar which operates the knob locking means, and also serves to dog the latch-bolt; Fig. 9, a similar view of the means for dogging the knob yoke and knob hub; Fig. 10, an inside view of cap plate; Fig. 11, a transverse detail section through the cap plate and base plate of the casing and through the key controlled cylinder; Fig. 12, an edge view of knob yoke; Figs. 13, 14 and 15, detail views of the emergency key, master maid's key and change key, respectively.

In all figures, similar letters of reference represent like parts.

This invention relates particularly to hotel locks, and more especially to locks having a latch bolt and a single dead bolt, although various features of the invention are applicable to locks of other types.

One of the primary objects of the invention is to provide improved means for indicating to a person on the outside of the room, whether or not a dead bolt has been protracted from the inside of the room, so that generally it can be determined by said means whether or not the room is occupied. It is therefore intended to provide a lock having a latch bolt, a manual retracting device for the latch bolt at the outside of the door, a dead bolt protractable from either side of the door, and automatic means for dogging or blocking said manual retracting device, actuated by the protraction of the dead bolt from the inside of the door but unaffected by the protraction of said bolt from the outside.

Another important object of the invention is to provide a lock wherein the protraction of a dead bolt from one side of the door will cause a deadlocking member to be moved into operative position with respect to the latch bolt, whereas if the dead bolt is thrown from the opposite side of the door by certain means it will be moved independently of the dead-locking device for the latch bolt.

It is also intended to provide a lock having a dead bolt protractable from either side of the door, and provided with means at one side of the door which will protract the dead bolt and prevent the retraction thereof from the other side of the door by the ordinary retracting means, although the bolt will still be retractable from such opposite side of the door by special means such as an emergency key.

I also contemplate the provision of a lock having a slide operated by a thumb-turn or the like at the inside of the door and connected with a dead bolt to protract the same as said slide is protracted, the dead bolt being released for protraction by connection of the tumbler thereof with a member pivoted on said slide and rocked by the movement of the thumb-turn, whereby the bolt may be easily protracted by the thumb-turn without interfering with its protraction by another means, such as a key.

Other objects of the invention are to provide a lock having common tumbler mechanism for a dead bolt and a latch bolt dead-locking device; to improve and simplify the means for dogging the knob yoke; and to improve generally and in detail the construction and operation of locks of the class to which my invention relates.

To these and other ends, the invention consists in the novel features and combinations of parts to be hereinafter described and claimed.

Referring to the drawings, (Fig. 1) the lock herein shown is of the mortise type, but it is obvious that my invention may be applied also to locks of other forms. A casing 1 is adapted to be inserted in the mortise, and is provided with a face plate 2, and an ornamental and protective cover plate 3 secured to the face plate. A cap plate 4 is shown as secured to the inside of the casing. The lock is provided with a dead-bolt 5 and with a latch-bolt 6. The shank of the dead-bolt has a central longitudinal slot 7 adapted to slidably engage a tumbler post 8 rising from the base plate 9 of the casing, and serving to limit and guide the dead-bolt in its movement. The shank of the dead-bolt is also provided near its rear end in its upper edge with an open slot 10, provided at the ends thereof with shoulders 11 and 12, forming talons to receive the dog operated by the key inserted in the keyhole hereinafter described. Between these talons is adapted to project the lug 13 of a dead-bolt controlling tumbler 14, which is pivoted at 15 on said dead-bolt, and normally has its lug 13 pressed into upwardly projecting position between the talons 11 and 12 by means of a spring 16, which bears against a lug 17 on the shank of the bolt. The shank of the bolt and the tumbler 14 are provided with registering slots 18, both adapted to fit over a rotatable hub 19 mounted in the casing, and having an operating thumb turn 20 secured to the end thereof upon the inside of the door, whereby said hub is adapted to be operated only from the inside of the room. This hub is provided with wings 21, which embrace a pin 22, projecting outwardly from a secondary coupling tumbler 23, pivoted at 24, on a slide bar 25, which is held between and guided in its lateral reciprocating movement by ribs 26.

The tumbler 14, which constitutes means for controlling the operation of the dead-bolt independently of the dogging and locking means for the latch-bolt and its knob, is provided with a lug 27 adapted to engage the front or rear side of the post 8, rising from the base of the casing, when the bolt is in the protracted or retracted positions, respectively. This independent tumbler is actuated directly by means of a change key, or a master maid's key, as hereinafter described, and from the outside of the door only. This tumbler 14 is provided with a downwardly projecting coupling hook 30 which is adapted to coöperate with the lug 31 projecting outwardly from the coupling tumbler 23.

In the actuation of the dead-bolt independently by the change key or the master maid's key, which keys are inserted from the outside of the door only, the coupling hook 30 carried by the tumbler 14 is adapted to be carried below the lug 31 of the coupling tumbler, by the pressure of the bit of the key inserted in the keyhole, and thus the bolt may be protracted independently of the coupling tumbler and of the mechanism connected therewith, and similarly the dead-bolt may be retracted independently of said other parts.

By means of the thumb turn and its hub the bolt may be protracted through the direct engagement of the wings of the hub with the coupling tumbler 23. When this hub is turned clockwise, its wings will engage the pin projecting from the tumbler 23, and after rocking such tumbler on its pivot sufficiently to clear its lug 28 from the stop post 32, will carry such tumbler bodily toward the front wall of the casing. This movement will also carry the slide bar 25 laterally with the tumbler, and the slide bar 25, in turn, will carry along and protract the dead-bolt 5. The slide 25 is provided with an upwardly projecting arm 33 (Fig. 8) which, when the dead-bolt is retracted, lies back of a shoulder 34 (Fig. 5) at the under portion of the bolt. As the slide 25 is protracted, the arm 33 will strike the shoulder 34 and thereby protract the dead-bolt, the tumbler 14 being released by engagement of its depending hook 30 with the lug 31 of the pivoted member or tumbler 23 as the latter is swung downward by the movement of the thumb-turn. At the rear of the shoulder 34 of the dead-bolt, the latter is provided with a cutaway portion 34$^a$ which permits the protraction of the dead-bolt independently of the slide 25, as hereinafter set forth.

It will be seen that the dead-bolt, its independent controlling tumbler carried thereby, the coupling tumbler, and the slide bar will be simultaneously protracted bodily by the movement of the thumb turn. The turning of the thumb turn in the opposite direction will by the continued locking engagement of the two tumblers carry all of said parts back again, thus retracting the bolt.

The slide bar 25 in the protracted position is adapted to extend behind the head of the latch-bolt, and thus dog the latter against inward retraction, the slide bar being held in such dogged position by the engagement of the lug 28 of the tumbler 23 with the front side of the post 32. At its lower edge the slide bar 25 is provided with a front downwardly projecting lug 35, and with a similar rearward downwardly projecting lug 36. These lugs are adapted to alternately engage a pivoted catch plate 37 mounted on a pin extending from the base plate, and having in its upper edge a semicircular or otherwise curved slot 38 loosely engaging a fixed pin 39 projecting from the base plate in such manner that the catch plate will have an oscillating movement on its pivot limited by said pin 39. The catch plate is provided on each side of the pin 39 with inclined cam edges 40 adapted to be engaged respectively by the forward and rear actuating lugs 35 and 36 of the slide bar. A tongue or lug 41 projects outwardly from the edge of the catch plate, at the inner part thereof. This tongue is adapted to engage a slot 42 formed in the under side of a reciprocating latch bolt yoke 43. The forward movement of the slide bar by means of the contact of its rear lug 36 with the rear cam face 40 of the catch plate is adapted to rock the rear part of said catch plate downward so as to carry the catch lug or tongue 41 into engagement with the yoke 43, thus locking the latter against movement. In the rearward or retracting movement of the slide bar the contact of its forward lug 35 with the corresponding cam surface of the catch plate will oscillate said catch plate in the opposite direction, and thus release the lug of the catch plate from engagement with the yoke, whereby the latter may be again freely operated.

The yoke 43 has a shoulder 44 adapted to abut against, for the purpose of slidingly actuating, a head 45 of the shank 46 of the latch bolt 6. This shank is adapted to reciprocate in a guide bracket 47 against the inner end of which bears a washer 48 between which and the head of the latch-bolt is confined a coiled spring 49 adapted to hold the latch-bolt normally protracted. The yoke 43 is adapted to be moved inward so as to retract the latch-bolt by means of the wings 50 of a hub 51 which is engaged by the spindle of a knob 52. The yoke is held normally pressed inward by means of a spring 53.

The prime object both of dogging the latch-bolt and dogging the knob-yoke or shoe is to lock the knob against rotation so that when the loor is locked from the inside the locked position of the knob will so indicate. In effecting this end, it is clear that the means for dogging the latch-bolt may be dispensed with.

Referring now to the key mechanism whereby the dead-bolt, and in certain cases, the latch-bolt as well, are controlled in operation by the keys inserted from the outside of the door, a cylinder containing pin tumbler mechanism is mounted in the casing and has a keyhole adapted to receive keys only from the outside of the door.

54 is a flat change key adapted to fit the tumblers controlling a barrel 54' and a dog 55 at the inner end of the barrel, which dog is adapted to engage and operate the tumbler 14 only and acts to throw the dead-bolt, and to retract the same by engagement of the dog with the shoulders 11 and 12, without actuating the latch-bolt dogging mechanism or the knob yoke locking mechanism. A key 56, which is the master key for the use of the maids, is adapted to couple the barrel 54' and a sleeve 56' and turn a dog member 57 on the inner end of the sleeve, which member as in the case of the other dog is adapted to merely operate the tumbler 14 and protract and retract the dead-bolt independently of the other mechanism.

It will be seen that if the door has been locked from the inside by means of the thumb turn which, as before described, not only protracts the bolt but also dogs the latch-bolt and dead-locks the knob-yoke, then the door cannot be unlocked from the outside by either the key 54 or the key 56, because of the engagement of the downwardly projecting hook carried by the tumbler 14 with the projecting lug carried by the tumbler 23, the latter tumbler being locked against its rigid post.

Upon some emergency occasions, it is found necessary or desirable to unlock the door from the outside when it has been locked from the inside. To effect this purpose, a master emergency key 57 is provided which is of greater length than the other keys, and is of sufficient length to pass entirely through the cylinder to extend into and engage a rotating disk 58 provided with a dog 59 fixed on the inner face of the cap plate 4 by means of screws 60 which engage a circular slot formed in the cap plate and enter a rotating face disk 61 mounted on the front of the cap plate, whereby the dog member 59 is mounted rotatably within the body of the cap plate. The dog member 59 has a greater radius than the dogs 55 and 57, and when actuated by the master emergency key, it is adapted to contact with an elongated shoulder 62 of the auxiliary coupling tumbler 23, while the dogs 55 and 57 are also carried by the master key into engagement with the talons 11 and 12 of the dead-bolt. Upon turning the master emergency key anti-clockwise, therefore, the long dog 59 will be first carried into engagement with the shoulder 62 of the coupling tumbler 23 moving said tumbler downward, which movement by means of the engagement of said tumbler with the hook 30 also moves downward the independent tumbler 14, releasing both tumblers from their respective positions. The continued movement of the key carries the shorter dogs between the talons 11 and 12 of the dead-bolt, and the tumblers having now been released the bolt is retracted by the continued rotation of the key. By this movement, the slide bar is withdrawn from the dogging position behind the latch-bolt and the catch plate is oscillated out of engagement with the knob yoke, thus permitting the door to be opened.

The general operation of the device is as follows: Either one of the shorter keys 54 or 56 serves to protract or retract merely the dead-bolt, which keys are operated solely from the outside of the door. To lock the door from the inside the thumb turn 20 is rotated clock-wise, whereupon by means of its wings it will carry the tumbler 23 downward, which movement by means of the engagement of said tumbler with the hook 30 will also carry the tumbler 14 downward to release the latter from its post, and thereupon in the continued rotation of the thumb turn the bolt and its independent tumbler 14 and the auxiliary tumbler 23 and its connected slide bar 25 will all be moved bodily toward the face plate protracting the dead-bolt, carrying the slide bar into dogging position behind the latch bolt head and oscillating the lug of the catch plate into locking engagement with the knob yoke. In this position of the parts, it is impossible for the key 54 or the key 56 to unlock the door. The dogging of the latch-bolt serves to provide a locking bolt supplemental to the locking bolt provided by the dead-bolt, while the positive engagement of the catch slide with the close fitting slot of the knob yoke serves to lock the knob against rotation, and to prevent any lost motion between said knob and the point at which the locking takes place. The locked knob serves as an indication to the maid that the room is occupied, and thus obviates the necessity of the insertion of a key by her into the outside lock for the purpose of trying the lock. When in this locked position, the parts can only be unlocked by the inward rotation of the thumb turn on the inside of the door, or by the insertion and operation of the master emergency key from the outside as hereinbefore described.

It will be understood that the emergency key will protract the dead bolt, as well as retract it. When the parts are in the position shown in Fig. 2, the tumbler 23 will be released as the dog 59 is rotated by the emergency key simultaneously with the release of the tumbler 14 by the dog 57. The protraction of the bolt will then be effected by the engagement of the dog 57 with the shoulder or talon 11 of the bolt. As the tumblers 14 and 23 are released together, the coupling hook 30 continues to couple said tumblers together, and the tumbler 23 and slide 25 will be moved forward with the bolt. Hence, the keys of lower order will be inoperative to retract the bolt when the latter has been thrown by the emergency key, inasmuch as the dogs 55 and 57 are incapable of releasing the tumbler 23. The emergency key may therefore be used to lock the door against all of the other keys. When the bolt is thrown by the emergency key the slide 25 will deadlock the latch bolt and actuate the catch plate 37 to dog the knob yoke or shoe. The knob will be dogged under these circumstances, but in practice the emergency key will be used so seldom to lock the door against the other keys that the blocking of the knob will usually indicate that the door has been locked from the inside, as described above. In any event, the blocking of the knob will advise a chambermaid, or other person, that the door is locked against the keys of lower order. It will be understood that the tumbler 23 not only acts as a tumbler for the bolt, but also as a tumbler for the slide 25. Moreover, in a certain sense the regular tumbler 14 of the bolt serves as another tumbler for the slide 25, inasmuch as when said slide has once been moved to its deadlocking position, it cannot be retracted without actuating the tumbler 14.

I do not wish to limit myself to a construction in which the bolt tumblers are movable bodily with the bolt, or in which the different bolt tumblers are actuated by separate dogs, associated with a cylinder lock. These features of my invention are of considerable importance in some aspects of the invention, but in others they are immaterial. Of course, I have not attempted to illustrate and describe the numerous modifications of the construction which may be adopted within the scope of the invention as defined in the claims.

Having thus described my invention, what I claim is:—

1. In a lock, a latch bolt, a knob for retracting the same, a dead bolt, dogging means for said knob, means to actuate said dogging means and said dead bolt together, and other means to actuate said bolt independently of said dogging means; substantially as described.

2. In a lock, a dead bolt operable from the inside and from the outside of the door, a latch bolt, a latch bolt knob, separate means for dogging the latch bolt and for locking the knob against rotation, and means actuated by the protraction of said dead bolt from the inside of the door to operate both said dogging means and said knob locking means; substantially as described.

3. In a lock, a dead bolt operable from either side of the door, a latch bolt, a latch bolt knob, separate means for dogging the latch bolt and for locking the knob against rotation, and means actuated by a protraction of the dead bolt from the inside of the door, but unaffected by a protraction of said dead bolt from the outside of the door, to operate said latch dogging and knob locking means; substantially as described.

4. In a lock, a dead bolt, a change key to protract said dead bolt from the outside of the door, means to protract said dead bolt from the inside of the door, a latch bolt, a latch bolt knob, and means to block said knob against rotation when said dead bolt is protracted from the inside, said means being inoperative to block said knob when said bolt is protracted by said change key; substantially as described.

5. In a lock, a dead bolt, protractable from one side of the door by means of a series of keys, including a change key, and also protractable from the opposite side of the door, a latch bolt, a latch bolt manipulating member, and means to block said manipulating member automatically as said bolt is protracted from the second named side of the door, said means being inoperative to block said member when said bolt is protracted by said change key from the first named side of the door; substantially as described.

6. In a lock, a dead bolt, key mechanism to protract said dead bolt from the outside of the door, means to protract said dead bolt from the inside of the door, a latch bolt, a latch bolt manipulating member, and means for blocking said member actuated by the second only of said dead bolt protracting means; substantially as described.

7. In a lock, a dead bolt, key mechanism to protract said dead bolt from the outside of the door, means to protract said bolt from the inside of the door, a latch bolt, a manually operable latch bolt retracting device at the outside of the door, and means for dogging said device automatically as said dead bolt is protracted by the inside protracting means but free for actuation when said bolt which leaves it is protracted by said key mechanism; substantially as described.

8. In a lock, a dead bolt, a plurality of keys, including a change key to protract said bolt from one side of the door, thumb-turn mechanism to protract said bolt from the opposite side of the door, a latch bolt, a manually operable latch bolt retracting device, and means for dogging said device automatically as said bolt is protracted by said thumb-turn mechanism, but which leaves it free for actuation when the change key is rotated to protract the bolt; substantialy as described.

9. In a lock, a dead bolt, key mechanism at one side of the door for actuating said dead bolt, a thumb-turn mechanism operated from the opposite side of the door to actuate said dead bolt, a latch bolt, and a latch bolt deadlocking device unaffected by the protraction of said dead bolt by the key but operated automatically as said dead bolt is protracted by the thumb-turn mechanism; substantially as described.

10. In a lock, a dead bolt, key mechanism at the outside of the door for protracting and retracting said dead bolt, means at the inside of the door for protracting and retracting said dead bolt, a latch bolt, a latch bolt knob, a knob yoke, and a dogging device for said yoke actuated by the inside protracting and retracting means for the dead bolt; substantially as described.

11. In a lock, a latch bolt, a deadlocking device therefor, a dead bolt separate from said deadlocking device, and a common tumbler mechanism for said dead bolt and said deadlocking device; substantially as described.

12. In a lock, a latch bolt, a deadlocking device therefor, a dead bolt, and interconnected tumblers on the deadlocking device and dead bolt respectively; substantially as described.

13. In a lock, the combination of two sliding members, one of said members adapted to engage and protract the other, but such other member being protractable independently, tumblers for the respective members, carried thereby, a key for protracting both of said members together by means of said first member, and another key operative from the same side of the door for protracting the other member independently; substantially as described.

14. In a lock, a latch bolt, a deadlocking device therefor, a dead bolt, a single means to throw said dead bolt and move said deadlocking device to its operative position, and means to operate said dead bolt independently of said deadlocking device; substantially as described.

15. In a lock, a latch bolt, a deadlocking device therefor, a dead bolt, means to actuate said dead bolt and said deadlocking device together, and other means to actuate said bolt without operating said deadlocking device; substantially as described.

16. In a lock, the combination of two sliding members, one of said members adapted to protract the other but such other member being proctractable independently, tumblers for the respective members, a pin tumbler lock mechanism, a key adapted to said pin tumbler lock mechanism for protracting both of said members together by means of said first named member, and another key adapted to said pin tumbler mechanism for protracting the other member independently; substantially as described.

17. In a lock, the combination of a bolt, a thumb-turn member for protracting said bolt from the inside of the door, a key for protracting said bolt from the outside of the door, an indicator at the outside of the door, and means for setting said indicator when the bolt is protracted by one of the aforesaid protracting devices without so setting it when the bolt is protracted by the other protracting device; substantially as described.

18. In a lock, a latch bolt, a deadlocking device therefor, a dead bolt, manually operable means at the inside of the door to throw said dead bolt and simultaneously move said deadlocking device to operative position, and means at the outside of the door to protract and retract said dead bolt independently of said deadlocking device; substantially as described.

19. In a lock, the combination of a bolt, protracting means for said bolt operable from the outside of the door, another and different protracting means out of alinement with the first for protracting said bolt from the inside of the door, and an indicator at the outside of the door arranged to be set in indicating condition by one of said protracting means but not by the other protracting means; substantially as described.

20. In a lock, a latch bolt, a deadlocking device therefor, a dead bolt, a common tumbler mechanism for said dead bolt and said deadlocking device, and means to actuate said dead bolt independently of said deadlocking device; substantially as described.

21. In a lock, the combination of a bolt, thumb-turn means for protracting said bolt from the inside of the door, an indicator at the outside of the door set in indicating condition by the protraction of said bolt by said thumb-turn means, and a key for protracting said bolt from the outside of the door without setting said indicator; substantially as described.

22. In a lock, a latch bolt, a deadlocking device therefor, and a dead bolt movable with said deadlocking device or independently thereof; substantially as described.

23. In a lock, a latch bolt, a latch bolt knob, a knob yoke, a deadlocking device for and movable parallel to said latch bolt, and a locking device for said knob yoke actuated by said deadlocking device, as the latter is moved to deadlocking position; substantially as described.

24. In a lock, a latch bolt, a latch bolt knob, a latch bolt yoke, a deadlocking slide for the latch bolt movable parallel to said latch bolt, and a pivoted member actuated directly by said deadlocking slide, as the latter is moved to operative position, to engage and block said latch bolt yoke; substantially as described.

25. In a lock, a dead bolt, and a thumb-turn operated member movable with and parallel to said dead bolt and connected with the latter; substantially as described.

26. In a lock, a dead bolt retractable by a key inserted at the outside of the door, a slide connected with said dead bolt, and a thumb-turn device operable from the inside of the door to actuate said slide; substantially as described.

27. In a lock, a dead bolt retractable by a key inserted at the outside of the door, a member connected with said dead bolt and retractable by the retraction of the same, interconnected tumblers for said dead bolt and said member, and a thumb-turn device to operate said member; substantially as described.

28. In a lock, a dead bolt, a tumbler therefor, a slide movable with said dead bolt, a rotary thumb-turn hub, and a pivoted member on said slide actuated by said hub and connected with said dead bolt tumbler to actuate the same; substantially as described.

29. In a lock, a dead bolt, a pivoted tumbler therefor, a slide for protracting said dead bolt, a member movably mounted on said slide and connected with said dead bolt tumbler to release the latter, and means to operate said member to protract the dead bolt and slide together; substantially as described.

30. In a lock, a dead bolt having a shoulder, a tumbler for said dead bolt, a slide movable parallel to said dead bolt and having an arm to engage said shoulder and thereby protract the bolt as said slide is protracted, means for releasing the tumbler of said dead bolt, and means for protracting said slide; substantially as described.

31. In a lock, a dead bolt, a tumbler therefor, a member movable bodily with said dead bolt to protract the latter, means to operate said member, and means carried by said member for releasing the dead bolt tumbler; substantially as described.

32. In a lock, a latch bolt, a retracting knob therefor, a dead bolt, means for dogging said knob, means actuated from one side of the door to operate said dead bolt and said dogging device together, and means operative from the opposite side of the door to protract said bolt without dogging said knob; substantially as described.

33. In a lock, a latch bolt, a retracting knob therefor, a knob dogging device, a dead bolt, means actuated from the inside of the room to throw said dead bolt and said dogging device into operative position at the same time, and mechanism operated by a key at the outside of the room to protract said bolt without dogging said knob; substantially as described.

34. In a lock, a dead bolt, a tumbler therefor, means operable from one side of the door to protract and retract said bolt, and means at the opposite side of the door to protract said bolt and simultaneously block said tumbler directly against movement by said first means; substantially as described.

35. In a lock, a dead bolt, a plurality of keys, including a change key, to protract said bolt from the outside of the door, means to protract said bolt from the inside of the door, a latch bolt, a knob, and a yoke to retract the latch bolt by the movement of said knob, dogged automatically by the protraction of said dead bolt from the inside but free for actuation when the said change key is rotated to protract said bolt; substantially as described.

36. In a lock, a dead bolt, a plurality of keys, including an emergency key, to protract said bolt from the outside of the door, means to protract said bolt from the inside of the door, and means to prevent the retraction of said bolt from the outside by one of said keys but not by the emergency key when said bolt has been thrown from the inside; substantially as described.

37. In a lock, a dead bolt, a latch bolt, a knob for retracting said latch bolt, separate means for dogging the latch bolt and blocking the rotation of the knob, and means actuated by the protraction of said dead bolt to operate both of said means; substantially as described.

38. In a lock, a dead bolt, a change key to operate the same, an emergency key to operate said bolt, a latch bolt, a latch bolt manipulating device, and dogging means for said manipulating device movable into dogging position by the emergency key, but not by said change key; substantially as described.

39. In a lock, a dead bolt, a change key to protract said bolt from the outside of the door, an emergency key to protract said bolt from the outside of the door, means to protract said bolt from the inside of the door, a latch bolt, a latch bolt knob, and means for dogging said knob automatically as said bolt is protracted by said emergency key, or by said inside means, said dogging means being inoperative as the bolt is protracted by said change key; substantially as described.

40. In a lock, a dead bolt, a series of keys, to protract said bolt, a latch bolt, a latch bolt knob, and dogging means for said knob actuated automatically in the operation of said bolt by one of said keys, but inoperative by another one of said keys; substantially as described.

41. In a lock, a dead bolt, a plurality of tumblers movable with said bolt, means at one side of the door to protract said bolt by the individual actuation of one of said tumblers, and means to protract said bolt from the opposite side of the door by the actuation of all of said tumblers; substantially as described.

42. In a lock, a dead bolt, a slide, and a common tumbler mechanism for said dead bolt and said slide; substantially as described.

43. In a lock, a dead bolt, a slide and interengaging tumblers mounted on the dead bolt and slide respectively; substantially as described.

44. In a lock, a dead bolt, a slide, and tumblers mounted on said dead bolt and slide respectively, and having a one-way connection between them; substantially as described.

45. In a lock, a dead bolt, a slide movable parallel to said dead bolt, a single means to throw said dead bolt and said slide, and means to operate said dead bolt independently of said slide; substantially as described.

46. In a lock, a dead bolt, a slide, means to actuate said dead bolt and slide together, and means to actuate said bolt independently without operating said slide; substantially as described.

47. In a lock, a dead bolt, a slide, manually operable means at the inside of the door to protract said dead bolt and said slide simultaneously, and key mechanism at the outside of the door to protract and retract said dead bolt independently of said slide; substantially as described.

48. In a lock, a dead bolt, a slide, manually operable means at the inside of the door to protract said dead bolt and said slide simultaneously, a plurality of keys, means operative by one of said keys at the outside of the door to protract and retract said dead bolt independently of said slide, and means operative by another key at the outside of the door to protract and retract said dead bolt and slide together; substantially as described.

49. In a lock, a dead bolt, a member slidable parallel to said bolt, a common tumbler mechanism for said member and said bolt, involving a plurality of tumblers, means to operate all of said tumblers from the inside of the door, key mechanism at the outside of the door, a key for use with said key mechanism, adapted to actuate one of said tumblers and protract and retract the dead bolt independently of said sliding member, and another key for use with said key mechanism, adapted to operate all of the tumblers and to actuate the dead bolt and sliding member together; substantially as described.

50. In a lock, the combination of a dead bolt, a slide movable parallel to said dead bolt, and adapted to protract the same, there being a lost motion connection between said slide and said bolt, which permits the bolt to be protracted independently, a tumbler mounted on the slide, a tumbler mounted on the bolt, means of connection between said tumblers, whereby one actuates the other; means at the inside of the door coöperating with both of said tumblers to protract the slide and bolt, and means at the outside of the door coöperating with the bolt and the tumbler thereof to protract the bolt independently of the slide; substantially as described.

51. In a lock, the combination of a bolt, a slide movable parallel to the bolt and adapted to protract the bolt, a tumbler on the slide, a tumbler on the bolt, there being a lost motion connection between the slide and bolt, which permits the bolt to be protracted independently of the slide, means for operating the respective tumblers, and means of connection between the tumblers for operating one from the other, and for retracting the bolt by means of the slide; substantially as described.

52. In a lock, the combination of a dead bolt, a slide movable parallel to said dead bolt, and having a lost motion connection with said bolt, whereby the slide is adapted to protract the bolt, but the bolt is adapted to be protracted independently of the slide, connected tumbler mechanisms for said bolt and slide, means at the inside of the door to operate both of said tumbler mechanisms and to protract said bolt by means of said slide, and a pin tumbler mechanism, operative from the outside of the door to actuate the tumbler mechanism of the bolt independently and protract the bolt independently of said slide; substantially as described.

53. In a lock, the combination of a dead bolt, a slide movable parallel to said dead bolt, and adapted to protract the same, said bolt having a lost motion connection with said slide whereby the bolt may be protracted independently of the slide, tumblers mounted on the bolt and slide respectively, the slide tumbler having means of engagement with the bolt tumbler to operate the latter, thumb-turn means at the inside of the door to operate the slide tumbler, and thereby the bolt tumbler, and to protract the bolt by means of the slide, key mechanism at the outside of the door, a key adapted to operate said key mechanism to actuate the bolt tumbler independently of the slide tumbler and to protract the bolt independently of the slide, and another key for use with said key mechanism, adapted to actuate both tumblers and protract the slide and bolt together; substantially as described.

54. In a lock, a case, a dead bolt therein, a reciprocating bolt operating member therein coöperating with said bolt, a tumbler mechanism coöperating with said bolt, key controlled means operable from one side of the door and coöperating with said tumbler mechanism and bolt to project and retract said bolt, and manually controlled means operable from the opposite side of the door, and coöperating with said tumbler mechanism to project and retract said bolt independently of said key controlled means; substantially as described.

55. In a lock, a case, a dead bolt therein, a reciprocating bolt operating member therein coöperating with said bolt, a tumbler mechanism coöperating with said bolt, key controlled means operable from one side of the door and coöperating with said tumbler mechanism and bolt to project and retract said bolt, and manually controlled means operable from the opposite side of the door and coöperating with said tumbler mechanism to project and retract said bolt independently of said key controlled means, and operative to block the retraction of said bolt from the opposite side through said key controlled means; substantially as described.

56. In a lock, a case, a dead bolt therein, a reciprocating bolt operating member, primary tumbler mechanism coöperating with said dead bolt, secondary tumbler mechanism coöperating with said reciprocating bolt operating member, key controlled means operable from one side of the door and coöperating with said primary tumbler mechanism and bolt to project and retract said bolt independently of said reciprocating bolt operating member, and manually controlled means operable from the opposite side of the door coöperating with said secondary tumbler mechanism to operate both of said tumbler mechanisms and to project and retract said bolt by means of said reciprocating bolt operating member, independently of said key controlled means; substantially as described.

57. In a lock, the combination of a bolt, a plurality of keys to operate the same, and an indicator operative by one of said keys, but inoperative by another of said keys; substantially as described.

In witness whereof, I have hereunto set my hand on the 8th day of April, 1911.

ALBERT A. PAGE.

Witnesses:
HENRY H. MUNSON,
JAMES DUNCAN.

Copies of this patent may be obtained for five cents each, by addressing the "Commissioner of Patents, Washington, D. C."